(12) United States Patent
Mattocci

(10) Patent No.: US 12,011,894 B2
(45) Date of Patent: Jun. 18, 2024

(54) METHOD AND APPARATUS FOR MANUFACTURING A TYRE TREAD AND A TYRE

(71) Applicant: BRIDGESTONE EUROPE NV/SA, Zaventem (BE)

(72) Inventor: Roberto Mattocci, Rome (IT)

(73) Assignee: BRIDGESTONE EUROPE NV/SA (BE)

( * ) Notice: Subject to any disclaimer, the term of this patent is extended or adjusted under 35 U.S.C. 154(b) by 34 days.

(21) Appl. No.: 17/868,150

(22) Filed: Jul. 19, 2022

(65) Prior Publication Data

US 2022/0347955 A1  Nov. 3, 2022

Related U.S. Application Data

(62) Division of application No. 16/334,304, filed as application No. PCT/EP2017/073925 on Sep. 21, 2017, now Pat. No. 11,420,406.

(30) Foreign Application Priority Data

Sep. 26, 2016 (IT) .......................... 102016000096381

(51) Int. Cl.
*B29D 30/62* (2006.01)
*B29D 30/52* (2006.01)
(Continued)

(52) U.S. Cl.
CPC ............. *B29D 30/62* (2013.01); *B29D 30/52* (2013.01); *B29D 30/58* (2013.01); *B29D 30/60* (2013.01);
(Continued)

(58) Field of Classification Search
CPC ........ B29D 30/52; B29D 30/58; B29D 30/60; B29D 30/62; B29D 30/66; B29D 30/16; B29D 30/1621; B29D 30/1628; B29D 30/242; B29D 30/30; B29D 30/3021; B29D 30/3028; B29D 30/68; B29D 2030/0612; B29D 2030/685; B60C 11/0311; B60C 11/0041; B60C 11/11; B60C 11/18; B60C 11/1346; B60C 2011/0091; B60C 2200/06; B60C 2200/08; B29C 48/00; B29L 2030/002
(Continued)

(56) References Cited

U.S. PATENT DOCUMENTS

| 4,756,353 | A * | 7/1988 | Nordsiek | ............... B29D 30/52 524/505 |
| 6,576,077 | B1 * | 6/2003 | Mitsuhashi | ............. B29C 48/35 156/130.7 |

(Continued)

*Primary Examiner* — Sedef E Paquette
(74) *Attorney, Agent, or Firm* — Bryan Jaketic

(57) ABSTRACT

A method of manufacturing an agricultural tyre (1) with deep cross-lugs (6), comprising the steps of: (a) proving a tyre case (2) and tread belts (3); (b) applying rubber blocks (206) onto tread belts (3), each of such rubber blocks (206) being arranged to make a respective lug (6) of the final tread (4); (c) winding a rubber ribbon (200) above said rubber blocks (206) so as to completely enclose said rubber blocks (206); (d) curing the rubber blocks (206) together with the wound ribbon (200) in a curing mould (105) negatively reproducing a desired pattern of the tread (4).

15 Claims, 3 Drawing Sheets

(51) Int. Cl.
 *B29D 30/58* (2006.01)
 *B29D 30/60* (2006.01)
 *B29D 30/66* (2006.01)
 *B29L 30/00* (2006.01)

(52) U.S. Cl.
 CPC ........ *B29D 30/66* (2013.01); *B29L 2030/002* (2013.01)

(58) Field of Classification Search
 USPC .................................. 156/110.1, 130, 130.5
 See application file for complete search history.

(56) References Cited

U.S. PATENT DOCUMENTS

| | | | |
|---|---|---|---|
| 7,947,140 B2 * | 5/2011 | Uchida | B29C 48/07 156/189 |
| 2002/0056496 A1 * | 5/2002 | Tanaka | B29D 30/60 156/122 |
| 2010/0236695 A1 * | 9/2010 | Lamontia | B60C 1/0016 152/209.1 |
| 2011/0036485 A1 | 2/2011 | Rey | |
| 2011/0146885 A1 * | 6/2011 | D'Sidocky | B29C 48/21 264/177.1 |
| 2013/0087259 A1 | 4/2013 | Mancini | |
| 2014/0034199 A1 | 2/2014 | Buxton | |
| 2015/0107755 A1 | 4/2015 | Mattocci | |
| 2015/0122402 A1 * | 5/2015 | Mattocci | B29D 30/0662 156/95 |

* cited by examiner

METHOD AND APPARATUS FOR MANUFACTURING A TYRE TREAD AND A TYRE

TECHNICAL FIELD OF THE INVENTION

The present invention relates to a method and a system for manufacturing a tyre tread having a deep tread pattern, in particular a tread with lugs.

The invention pertains mainly to all the tyres featured of lug tread pattern, in particular to agricultural tyres and, generally speaking, to tyre used on off-road work vehicles, for example farm vehicles, earthmoving machinery and the like.

BACKGROUND

Heavy-duty tyres of the type mentioned above have a tread with a toroidal base extending about a central axis of rotation of the tyre, from which base a plurality of (deep) lugs project radially outwardly. Each lug extends substantially crosswise to the travelling direction of the tyre and at selected angles with respect to adjacent lugs.

At present, such tyres with lugs are manufactured according to the following steps. A tyre casing is prepared and arranged onto a building drum. Tread belts, made of metal or textile, are wound about the casing and a smooth, green-rubber blank tread is wound over the belts. This assembly is inserted inside a curing mould negatively reproducing the tread (i.e. lugs) pattern. During the curing process, the rubber of the blank tread is heated and subjected to high pressure to adapt to the shape of the curing mould and so form the tread pattern.

As mentioned above, the tread pattern includes lugs which may be exceptionally large and may project upwards considerably from the rest of the tread. Accordingly, forming the lugs ex novo in the curing mould involves considerable rubber displacement inside the mould, i.e. a large amount of rubber must migrate from one part of the mould to another.

This rubber flow inside the curing mould prevents the formation of an evenly thick tread base. Such uneven tread base (differing widely in thickness) may result in defects and flaws.

Moreover, in order to prevent too thin a rubber thickness at the thinnest parts of the tread base, the average thickness of the tread base must be 'oversized' with respect to an optimum thickness that could be used if the tread base were perfectly even. Oversizing the average thickness of the tread base means that more material (rubber) is required to produce the tyre (with no advantage in terms of nominal tyre performance), thus increasing the manufacturing costs and the tyre weight.

To eliminate these drawbacks, it has been proposed to reduce the thickness of the blank tread wound about the casing (with the belts in between) and to apply green-rubber blocks, or bars, at the areas of the blank tread where the lugs are to be formed. This arrangement reduces the amount of rubber that has to migrate from one part of the curing mould to another, by providing more rubber (in the form of rubber blocks) where it is needed (to form the lugs) right from the onset. Even using rubber blocks, however, the thickness of the tread base may still remain significantly uneven, especially at tyre sides, or shoulders, where the lugs are generally larger.

Improvements to this known art method aimed at reducing the thickness of the tread base and its unevenness following the moulding process have been proposed in WO2013156982A1 and WO2013156983A1.

Notwithstanding the above, the known art methods to manufacture tyres with lugs are still perfectible in several aspects.

First of all, an important risk remains that, during tyre service on the field, separation or cracking does occur at the connection, or junction, between the base tread and the protruding lugs. This inconvenience is related also to the fact that the junction between each block (i.e. lug) and tread base is a "cold" one, being generally obtained during vulcanization (and not by extrusion). Said separation or cracking may affect block (i.e. lug) junctions at both the tyre centre and shoulders. Moreover, even when the manufacturing methods provides that blocks are applied onto a tread blank, moulding defects relating to rubber flow may still happen. Furthermore, the quantity of rubber material used and, consequently, tyre weight are still to be optimized.

SUMMARY OF THE INVENTION

The technical problem underlying the present invention is therefore to provide a method of manufacturing a tyre, or a tyre tread, with lugs which allows overcoming the drawbacks explained above with reference to the known art.

The above problem is solved by a manufacturing method according to claim 1 and by a corresponding manufacturing apparatus according to claim 10.

Preferred features of the invention are recited in the dependent claims.

The method of the invention provides arranging shaped green blocks, or bars, above tread ply or plies (or belt/belts) and winding a shaped rubber ribbon on the green blocks. Subsequently, moulding can be performed in a conventional moulds.

In this way, by curing in the mould, the rubber ribbon makes the tread base and the combination of each block with a corresponding portion of the rubber ribbon makes a respective lug.

Blocks can be placed above tread plies onto a known drum of a Tyre Assembly Machine (TAM) off-line with respect to the manufacturing cycle, onto a TAM server or even off-line in a dedicated station.

The tread ribbon can be applied on line at TAM, with no need to extrude it off-line and then transport to TAM.

Generally speaking, the method does not require for any tread blank to be applied below the bars or blocks, i.e. directly onto the tread plies.

However, variant applications do not exclude that additional rubber material can be provided below the bars.

The method of the invention eliminates the risk of openings, cracking or separations at the junction between blocks (lugs) and tread base during service, as well as bar junctions contamination. In fact, the bar junctions are inside, and enclosed by, the ribbon and therefore are protected and not in contact with the soil.

In other words, the bars are inside the carcass and the junctions are protected by the rubber material of the ribbon.

Similarly, the tyre configuration according to the invention allows painting the green tire outside (e.g. by anti-blemish paint, release agent, or others) with no risk of bar junction contamination.

Moreover, bars can have a thinner gauge, so that they are easier to process (in particular during operations of extrusion, winding or cutting) and also easier to assembly on tread plies.

The invention also allows reducing rubber flow into lug parts of the mould and avoiding excess of rubber not needed to fill lug volume.

The invention is also capable of reducing rubber at inter-lug skid base area.

Tread weight can also be reduced, thanks to excess of rubber elimination, particularly at shoulder areas.

Furthermore, the invention allows producing tread ribbon and bars of different compounds. Typically, the cost of the bars compound can be reduced, as it is shielded by the tread ribbon. Moreover, the invention allows producing bar and/or tread ribbon by recycled rubber.

Additional advantages are also die shape communality among different tyre sizes and models, improvement in tyre moulding defects (both at centre and shoulders) and a lower risk of trapped air between lugs and tread base.

Other advantages, features and use modes of the present invention will be understood from the following detailed description of some embodiments, provided by way of example and not with limitative purpose.

SHORT DESCRIPTION OF THE DRAWINGS

Reference will be made to the figures of the annexed drawing, wherein:

FIGS. 1 and 2 relate to an exemplary agricultural tyre which can be manufactured by a preferred embodiment of the method according the present invention, such figures showing a perspective front view and a partial cross-sectional view according to an axial plane of said tyre, respectively;

DETAILED DESCRIPTION OF PREFERRED EMBODIMENTS OF THE INVENTION

Figure 1:
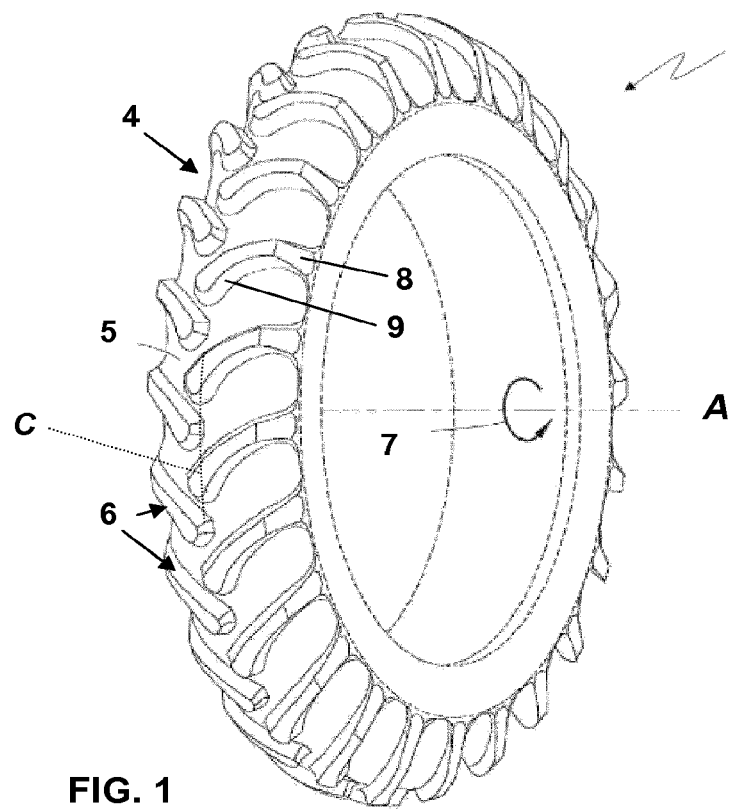
Figure 2:
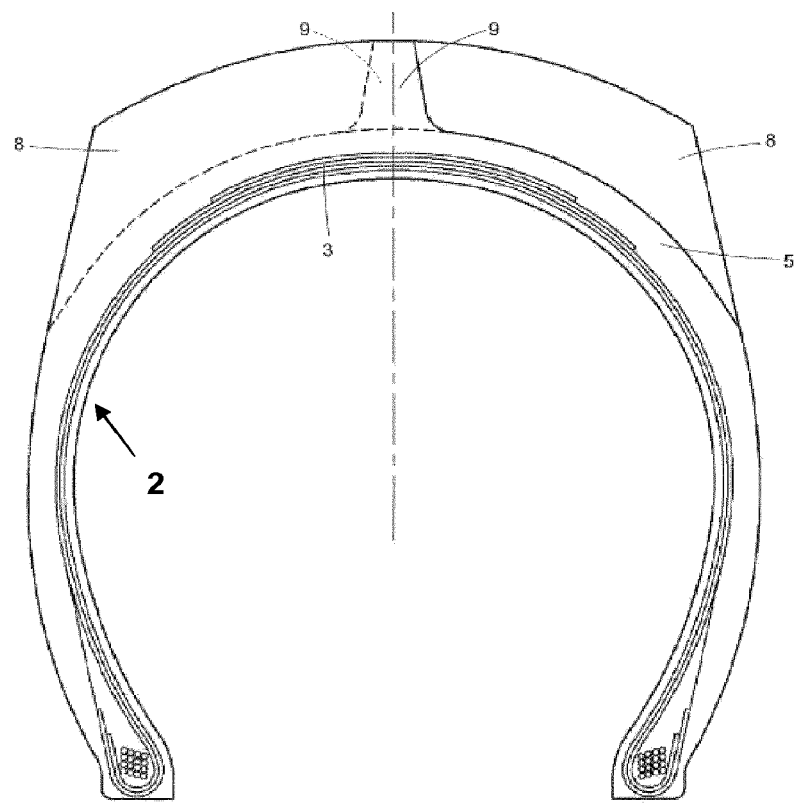

With reference to FIGS. 1 and 2, an agricultural tyre 1 has a central axis of rotation A. A rolling direction of tyre 1 is denoted by 7.

Tyre 1 comprises a toroidal casing 2, which extends about a central axis of rotation A and supports tread belts, or plies, 3 wound about casing 2.

Tyre 1 comprises a tread, globally denoted by 4, arranged about casing 2 and over belts 3 according to a toroidal configuration. Tread 4 comprises a tread base 5, which completely covers casing 2 and belts 3, and a plurality of lugs 6. Lugs 6 project upwards (i.e. extend radially outwards) from tread base 5 and are arranged substantially crosswise with respect to a tyre travelling direction.

Typically, lugs 6 are arranged symmetrically about axis of rotation A.

In the present embodiment, each lug 6 curves from a centreline C of tyre 1 to a corresponding shoulder and has a cross-sectional shape tapering away from tread base 5.

Each lug 6 has a lateral portion 8 at a shoulder of tyre 1 and a central portion 9 located in the central area of tyre 1. In the present embodiment, each lug 6 is thinner at central portion 9 and thicker at lateral portion 8. In the example provided, central portion 9 of each lug 6 has a greater curvature than lateral portion 8 (lateral portion 8 may also be assumed to be substantially straight).

As will be explained in detail shortly, tread base 5 is obtained by a moulding and curing process from a rubber ribbon blank. Each lug 6 is obtained by the same moulding and curing process as a superimposition of said rubber ribbon blank with a respective block or bar.

The manufacturing method described below allows tread base 5 to be of substantially constant thickness.

The manufacturing method of tyre 1 is shown schematically in FIGS. 3 and 3A to 3D.

In particular, casing 2 can be produced, in a conventional mode, on a building unit 101 and subsequently mounted onto a building drum 102 of a Tyre Assembly Machine (TAM).

Upon building drum 102, tread belts 3 are applied onto casing 2.

In a conventional unit 103, tread rubber is mixed and extruded (or calendered) into a strip 260.

Figure 3:
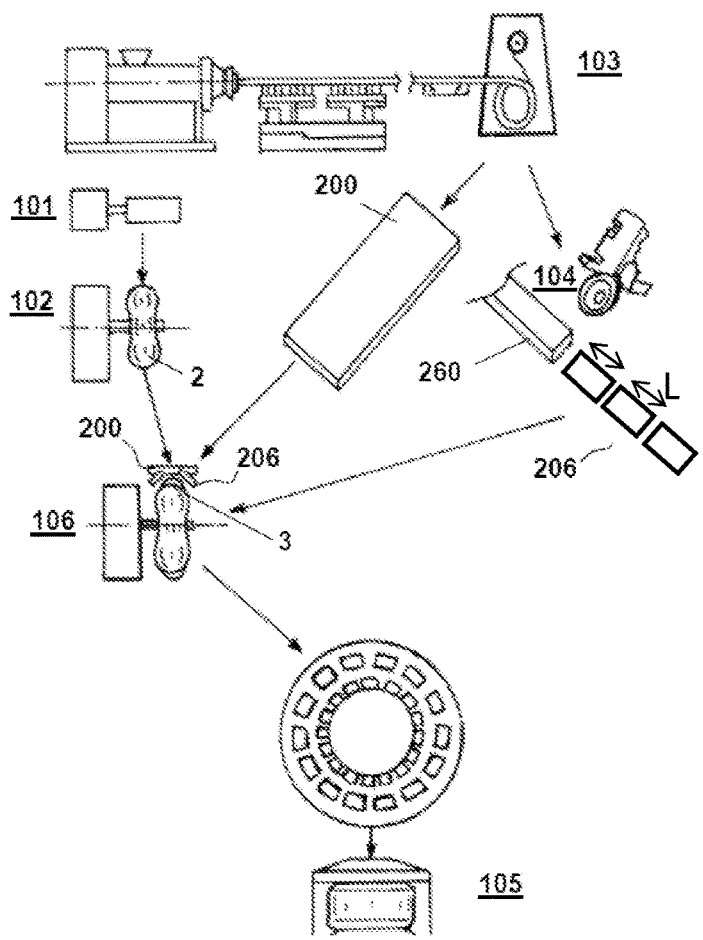
FIG. 3 shows a schematic representation of a sequence of manufacturing steps according to the aforementioned preferred embodiment of the method.
Figure 3A:
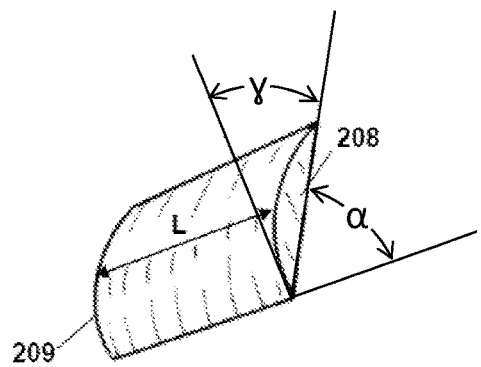
FIG. 3A shows a perspective view of a block or bar used in the method of FIG. 3.

In the same or in a separate unit 104, extruded (or calendered) strip 260 is cut into green tread bars (or blocks or elements) 206 (FIG. 3A). Each bar 206 has an inner portion 209 corresponding to central portion 9 of final lug 6 and an outer portion 208 corresponding to lateral portion 8 of final lug 6.

Tread belts 3 and tread bars 206 can assembled together directly onto drum 102, or they can be joined beforehand (i.e. "off-line") and subsequently placed on TAM and assembled with casing 2 and belts 3.

Figure 3C:
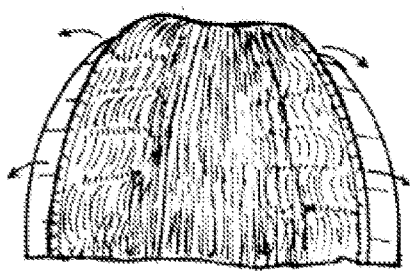
FIG. 3C shows a perspective frontal view of a subsequent intermediate product having also a tread ribbon applied onto the bars according to the method of FIG. 3.
Figure 3D:
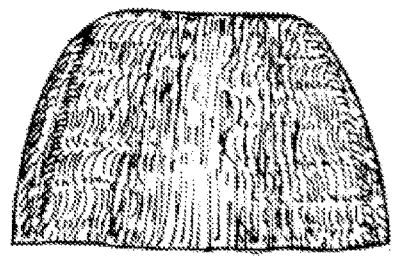
FIG. 3D shows a perspective frontal view of a final intermediate product ready for a moulding step according to the method of FIG. 3.
Figure 3B:
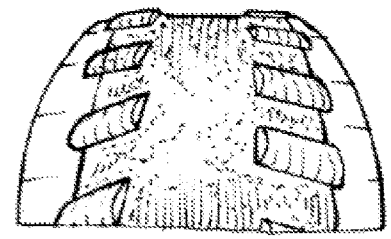
FIG. 3B shows a perspective frontal view of an intermediate product having a tyre case, tyre belts or plies and bars or blocks applied thereon according to the method of FIG. 3, which intermediate product is being formed onto a drum.

Bars 206 are lied upon belts 3 according to a selected arrangement and predetermined relative angles (FIG. 3B).

Bars 206 can be joined to belts 3 according to several processes, e.g. by heating, by interposition of chemical compounds or by any other known method for increasing rubber stitching and tackiness properties.

Subsequently, a tread ribbon 200 is would onto bars 206 lied upon drum 102 (FIG. 3C). To this aim, tread rubber is mixed and extruded (or calendered) in a green tread ribbon 200, for example in the same unit 103 mentioned above. Ribbon 200 can be applied by a Ribbon Tread Applicator 106, already known per se in the relevant field.

Thereafter, the tyre to be built is removed from drum 102 (FIG. 3D) and placed in a mould 105, wherein vulcanization (also using a press) takes place according to conventional means and modes.

Strip 260 and/or ribbon 200 can also be manufactured in advance and stored in coils.

Figure 4:
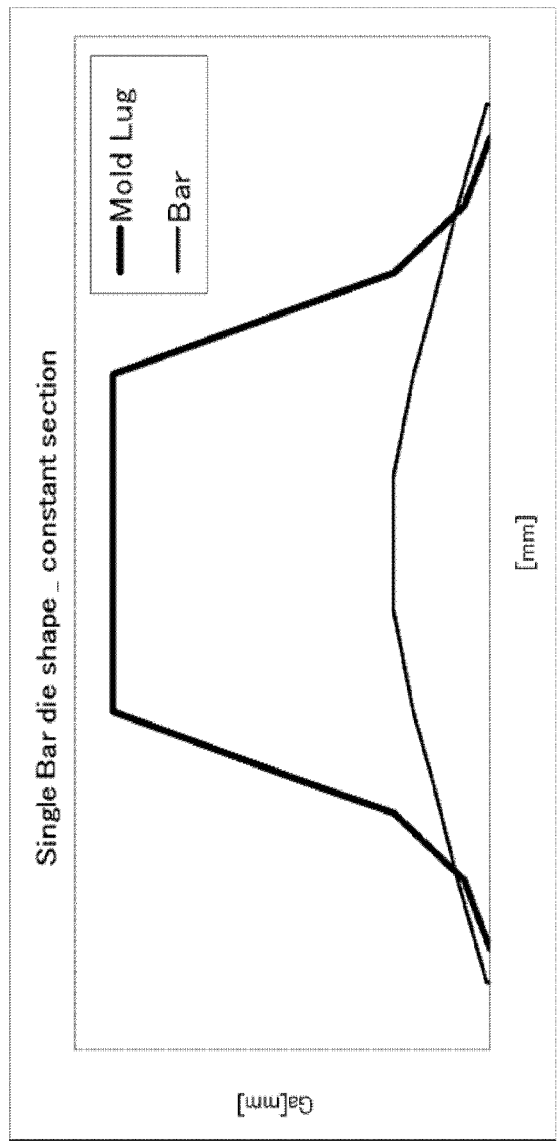
FIG. 4 shows a preferred embodiment of an exemplary cross-sectional profile of the bar of FIG. 3A.

With reference to FIGS. 3A and 4, it will be appreciated that dimensions and shape of strip 260 and bars 206 are not equal to the mould lug: they may have a lower height and a wider base, eventually by defining almost same volume.

Similarly, sharp outermost edges can be avoided.

Still with reference to FIG. 3A, each bar 206 can have a constant cross-section, preferably with a cut angle α (and bare angle γ as well) common for the two end cross-sections. In this way, the cutting operation is simplified and rubber wastes are avoided.

Generally speaking, the manufacturing method according to the present disclosure is simplified with respect to the prior art. In particular, preparation and winding of tread ribbon 200 is easier than manufacturing and arranging tread blank below blocks according to the known methods.

It will be appreciated that the above method avoids the need for assembling tread blank and bars. In fact, application of bars 206 on tread plies 3 is done before application of ribbon 200.

As already pointed out, the method disclosed allows an important reduction of excess rubber for the tread base with respect to the prior art.

Application of lubricants or other additives upon the semi-manufactured tread before vulcanization to favour air flow and rubber detachment is possible.

It will be appreciated that the method of the invention can be used either to build a new tyre or to regenerate the tread of a used one.

The present invention has been described so far with reference to preferred embodiments. It is intended that there may be other embodiments which refer to the same inventive concept and fall within the scope of the following claims.

What is claimed is:

1. An apparatus for manufacturing a tire, the tire including a tread comprising a tread base and a number of lugs, each of which projects upwards from the tread base and extends substantially crosswise to a travelling direction of the tire, the apparatus comprising the following units arranged in an operative sequence:
   a rubber mixing and extruding unit configured to output an extruded or calendered ribbon for making the tread base and an extruded or calendered strip for making rubber blocks, each of the rubber blocks being configured to make a respective lug of the tread;
   a drum unit configured to allow a tire casing, tread belts and rubber blocks be arranged one upon the other;
   a ribbon tread applicator configured to wind the extruded or calendered ribbon about the rubber blocks so as to shield the rubber blocks;
   a heater configured to join the rubber blocks to the tread belts; and
   a curing unit for the rubber blocks and wound ribbon, which curing unit comprises a mould negatively reproducing a desired pattern of the tread.

2. The apparatus of claim 1, further comprising a cutter configured to cut the extruded or calendered strip into the rubber blocks.

3. The apparatus of claim 2, wherein the cutter is configured to cut an inner wall and an outer wall in each of the rubber blocks, such that the inner wall is substantially parallel to the outer wall.

4. The apparatus of claim 2, wherein the cutter is configured to cut the extruded or calendered strip with an inclined crosswise cut.

5. The apparatus of claim 1, wherein the rubber mixing and extruding unit is configured to extrude or calender a continuous rubber strip having a cross-section corresponding to a transversal section of the rubber blocks.

6. The apparatus of claim 1, wherein the drum unit is dimensioned for building an agricultural tire.

7. An apparatus for manufacturing a tire, the apparatus comprising the following units arranged in an operative sequence: an extruder configured to extrude a green rubber strip; a cutter configured to cut the green rubber strip into a plurality of green rubber blocks; a drum unit configured to receive tread belts and the green rubber blocks arranged upon the tread belts; a ribbon tread applicator configured to wind a green rubber ribbon about the green rubber blocks so as to shield the green rubber blocks; a heater configured to join the green rubber blocks to the tread belts; and a vulcanization mold configured to receive the tread belts, the green rubber blocks, and the green rubber ribbon.

8. The apparatus of claim 7, wherein the extruder is further configured to extrude the green rubber ribbon.

9. The apparatus of claim 7, wherein the extruder, cutter, and mixer are part of the same unit.

10. The apparatus of claim 7, wherein the cutter is configured to cut an inner wall and an outer wall in each of the green rubber blocks, such that the inner wall is substantially parallel to the outer wall.

11. The apparatus of claim 7, wherein the cutter is configured to cut the green rubber strip with an inclined crosswise cut.

12. An apparatus for manufacturing a tire, the apparatus comprising the following units arranged in an operative sequence: a calender configured to calender a green rubber strip; a cutter configured to cut the green rubber strip into a plurality of green rubber blocks; a drum unit configured to receive tread belts and the green rubber blocks arranged upon the tread belts; a ribbon tread applicator configured to wind a green rubber ribbon about the green rubber blocks so as to shield the green rubber blocks; a heater configured to join the green rubber blocks to the tread belts; and a vulcanization mold configured to receive the tread belts, the green rubber blocks, and the green rubber ribbon.

13. The apparatus of claim 12, wherein the calender is further configured to calender the green rubber ribbon.

14. The apparatus of claim 12, wherein the cutter is configured to cut an inner wall and an outer wall in each of the green rubber blocks, such that the inner wall is substantially parallel to the outer wall.

15. The apparatus of claim 12, wherein the cutter is configured to cut the green rubber strip with an inclined crosswise cut.

* * * * *